(12) United States Patent
Santiago et al.

(10) Patent No.: US 9,862,122 B2
(45) Date of Patent: Jan. 9, 2018

(54) REINFORCED BLADDER

(71) Applicant: The Boeing Company, Chicago, IL (US)

(72) Inventors: Jonathan A. Santiago, Seattle, WA (US); Charles William Thomas, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 633 days.

(21) Appl. No.: 14/459,733

(22) Filed: Aug. 14, 2014

(65) Prior Publication Data

US 2016/0046044 A1    Feb. 18, 2016

(51) Int. Cl.

| | |
|---|---|
| B29C 33/50 | (2006.01) |
| B29C 70/34 | (2006.01) |
| B29C 43/36 | (2006.01) |
| B29K 105/24 | (2006.01) |
| B29K 21/00 | (2006.01) |
| B29K 309/08 | (2006.01) |
| B29L 31/00 | (2006.01) |

(52) U.S. Cl.
CPC .......... B29C 33/505 (2013.01); B29C 70/342 (2013.01); *B29C 43/3642* (2013.01); *B29C 2043/3649* (2013.01); *B29K 2021/00* (2013.01); *B29K 2105/246* (2013.01); *B29K 2309/08* (2013.01); *B29L 2031/757* (2013.01)

(58) Field of Classification Search
CPC .......... B29C 33/505; B29C 2043/3649; B29C 43/3642; B29C 70/342
See application file for complete search history.

(56) References Cited

U.S. PATENT DOCUMENTS

| | | | | |
|---|---|---|---|---|
| 3,220,910 | A | * | 11/1965 | Walkey ................. B29C 53/602 156/155 |
| 5,152,949 | A | * | 10/1992 | Leoni .................. B29C 43/3642 264/257 |
| 7,293,737 | B2 | | 11/2007 | Engwall et al. |
| 7,879,276 | B2 | | 2/2011 | Guzman et al. |
| 8,043,554 | B2 | * | 10/2011 | Yip ....................... B29C 70/342 156/156 |
| 8,262,969 | B2 | * | 9/2012 | Wade .................... B29C 70/342 264/257 |
| 8,419,402 | B2 | | 4/2013 | Guzman et al. |
| 8,540,921 | B2 | * | 9/2013 | Senibi ...................... B32B 5/18 264/257 |

(Continued)

FOREIGN PATENT DOCUMENTS

WO    WO2011033741 A1    3/2011

OTHER PUBLICATIONS

Chapman et al., "Method and Apparatus for Reinforcing a Bladder," U.S. Appl. No. 14/035,007, filed Sep. 24, 2013, 46 pages.

*Primary Examiner* — Alison L Hindenlang
*Assistant Examiner* — Sean S Luk
(74) *Attorney, Agent, or Firm* — Yee & Associates, P.C.

(57) ABSTRACT

A method and apparatus for a reinforced bladder are provided. The reinforced bladder comprises a bladder with a cross-sectional shape formed of a polymeric material and a number of reinforcements. Each of the number of reinforcements covers only a portion of the cross-sectional shape such that part of the cross-sectional shape remains uncovered by the number of reinforcements.

20 Claims, 8 Drawing Sheets

(56) References Cited

U.S. PATENT DOCUMENTS

| | | | |
|---|---|---|---|
| 8,684,343 B2 | 4/2014 | Hiken et al. | |
| 8,926,313 B2* | 1/2015 | Sana | B29C 43/10 |
| | | | 264/257 |
| 9,120,276 B2* | 9/2015 | Wittenberg | B29C 70/885 |
| 9,327,467 B2* | 5/2016 | Robins | B29C 33/505 |
| 9,333,713 B2* | 5/2016 | Stephens | B29C 70/446 |
| 2004/0070108 A1* | 4/2004 | Simpson | B29C 70/342 |
| | | | 264/236 |
| 2008/0268208 A1* | 10/2008 | Martin | B29C 70/16 |
| | | | 428/174 |
| 2009/0176066 A1* | 7/2009 | Darrow | B29C 70/085 |
| | | | 428/175 |
| 2010/0009124 A1 | 1/2010 | Robins et al. | |
| 2010/0015265 A1* | 1/2010 | Vontell | B29C 33/3842 |
| | | | 425/53 |
| 2010/0139850 A1* | 6/2010 | Morris | B29C 33/485 |
| | | | 156/242 |
| 2010/0304094 A1* | 12/2010 | Brook | B29C 70/222 |
| | | | 428/174 |
| 2011/0115115 A1* | 5/2011 | Winter | B29C 70/504 |
| | | | 264/175 |
| 2011/0135886 A1* | 6/2011 | Winter | B29C 70/504 |
| | | | 428/178 |
| 2011/0277918 A1 | 11/2011 | Lee et al. | |
| 2012/0118424 A1* | 5/2012 | Cannon | B29C 63/16 |
| | | | 138/172 |
| 2012/0119412 A1* | 5/2012 | Havens | B29C 33/00 |
| | | | 264/230 |
| 2012/0235336 A1* | 9/2012 | Sana | B29C 33/505 |
| | | | 269/47 |
| 2013/0164465 A1* | 6/2013 | Lacombe | B64C 1/06 |
| | | | 428/34.1 |
| 2013/0235336 A1* | 9/2013 | Kozu | G02C 7/061 |
| | | | 351/159.42 |
| 2013/0316147 A1* | 11/2013 | Douglas | B64C 3/182 |
| | | | 428/172 |
| 2014/0186572 A1* | 7/2014 | Arevalo Rodriguez | B64C 1/064 |
| | | | 428/99 |
| 2014/0186578 A1* | 7/2014 | Outon Hern Ndez | B64C 1/064 |
| | | | 428/119 |
| 2015/0298388 A1* | 10/2015 | Wong | B29C 66/7394 |
| | | | 428/413 |

* cited by examiner

REINFORCED BLADDER

BACKGROUND INFORMATION

1. Field

The present disclosure relates generally to tools for forming aircraft parts and, in particular, to inflatable bladders. More particularly, the present disclosure relates to a method and apparatus for a reinforced bladder.

2. Background

Aircraft generally include an airframe, which may be regarded as an underlying skeleton to which skins are attached to form a smooth aerodynamic outer surface. The wings also include an underlying structure covered with skins. Typically, skins are light and thin to minimize the weight of the aircraft and increase its payload and range. Since skins are thin, they are generally flexible and require stiffening to prevent undesired movement, flexing, and vibration during flight.

Stringers of various shapes may be used for stiffening fuselage sections and wing skins on aircraft. These stringers may have acute angles that result in an I shape, J shape, trapezoidal shape, rectangular shape, semi-circular shape, or some other suitable shape.

Aircraft are being designed and manufactured with greater and greater percentages of composite materials. Composite materials are used in aircraft to decrease the weight of the aircraft. This decreased weight improves performance features such as payload capacity and fuel efficiency. Further, composite materials provide longer service life for various components in an aircraft.

Composite materials may be tough, light-weight materials created by combining two or more functional components. For example, a composite material may include reinforcing fibers bound in a polymer resin matrix. The fibers may be unidirectional or may take the form of a woven cloth or fabric. The fibers and resins may be arranged and cured to form a composite structure.

Composite stringers may be attached to a composite skin using fasteners, curing the composite stringers to the composite skin, or by other desirable methods. When composite stringers are cured directly to a composite skin, pressure may be applied to the composite stringers. Pressure may be applied using at least one of tooling external to the composite stringers or tooling within the composite stringers. Applying pressure unevenly may cause manufacturing inconsistencies such as voids, wrinkles, resin richness, and other inconsistencies.

Following curing, removing tooling from within the composite stringers may reduce the weight of the resulting aircraft. Further, following curing, failing to remove tooling from within the composite stringers may undesirably affect performance. Therefore, it would be desirable to have a method and apparatus that take into account at least some of the issues discussed above, as well as other possible issues.

SUMMARY

In an illustrative embodiment, a reinforced bladder is provided. The reinforced bladder comprises a bladder with a cross-sectional shape formed of a polymeric material and a number of reinforcements. Each of the number of reinforcements covers only a portion of the cross-sectional shape such that part of the cross-sectional shape remains uncovered by the number of reinforcements.

In another illustrative embodiment, a reinforced bladder is provided. The reinforced bladder comprises a bladder, a first reinforcement, a second reinforcement, and a number of reinforcements. The bladder has a trapezoidal cross-sectional shape formed of a polymeric material. The first reinforcement extends through a first fraction of a length of the bladder and across a portion of a shorter parallel side of the trapezoidal cross-sectional shape. The second reinforcement extends across a second fraction of the length of the bladder and across a portion of a longer parallel side of the trapezoidal cross-sectional shape. Each of the number of reinforcements extends a respective fraction of the length of the bladder and surrounds the trapezoidal cross-sectional shape.

A further illustrative embodiment of the present disclosure provides a method. The method comprises forming a bladder having a cross-sectional shape from an uncured rubber. The method also places a number of reinforcements onto the bladder, each of the number of reinforcements covering only a portion of the cross-sectional shape such that part of the cross-sectional shape remains uncovered by the number of reinforcements. The method further cures the bladder with the number of reinforcements to form a reinforced bladder.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account one or more different considerations. For example, the different illustrative embodiments recognize and take into account that inflatable bladders may be used within composite stringers to apply pressure to the composite stringers during consolidation, curing, or other composite processing. These bladders provide an internal mold line for the composite stringers.

Further, the different illustrative embodiments recognize and take into account that using bladders formed only of a polymeric material without reinforcement to apply pressure to composite stringers may be undesirable. Specifically, a bladder formed only of a polymeric material without reinforcement may tear as the bladder is pulled from within a composite stringer following curing. Further, the different illustrative embodiments recognize and take into account that a bladder formed only of a polymeric material without reinforcement may have highest point stresses at the ends of the bladder. These point stresses could initiate a tear which could extend through the remainder of the unreinforced bladder.

Yet further, the different illustrative embodiments recognize and take into account that composite structures such as composite skins may have features such as joggles, ramp ups, ramp downs, bends, twists, curvatures, or other feature which vary the cross-section of a composite skin. The illustrative embodiments recognize and take into account that polymeric bladders having fibrous reinforcement surrounding the polymeric material may have a stiffness that is too great to conform to features of composite structures. The illustrative embodiments further recognize and take into account that inconsistencies such as resin richness may result in a composite stringer if a bladder fails to conform to features of the composite structure. Specifically, pressure may not be evenly applied to composite stringers, resulting in inconsistencies.

It may be desirable to have substantially the same amount of resin throughout a composite material. An area exhibits resin richness when resin pools in the area. Resin richness may result in an area in which resin of a few thousandths of an inch is present without fabric. An area of resin richness may be white or creamy and difficult to see through.

Inspecting for resin richness may be more costly and time-consuming than desired. Further, if an unacceptable amount of resin richness is present, the composite structure is reworked. Reworking the composite structure adds further expense and time.

Figure 1:
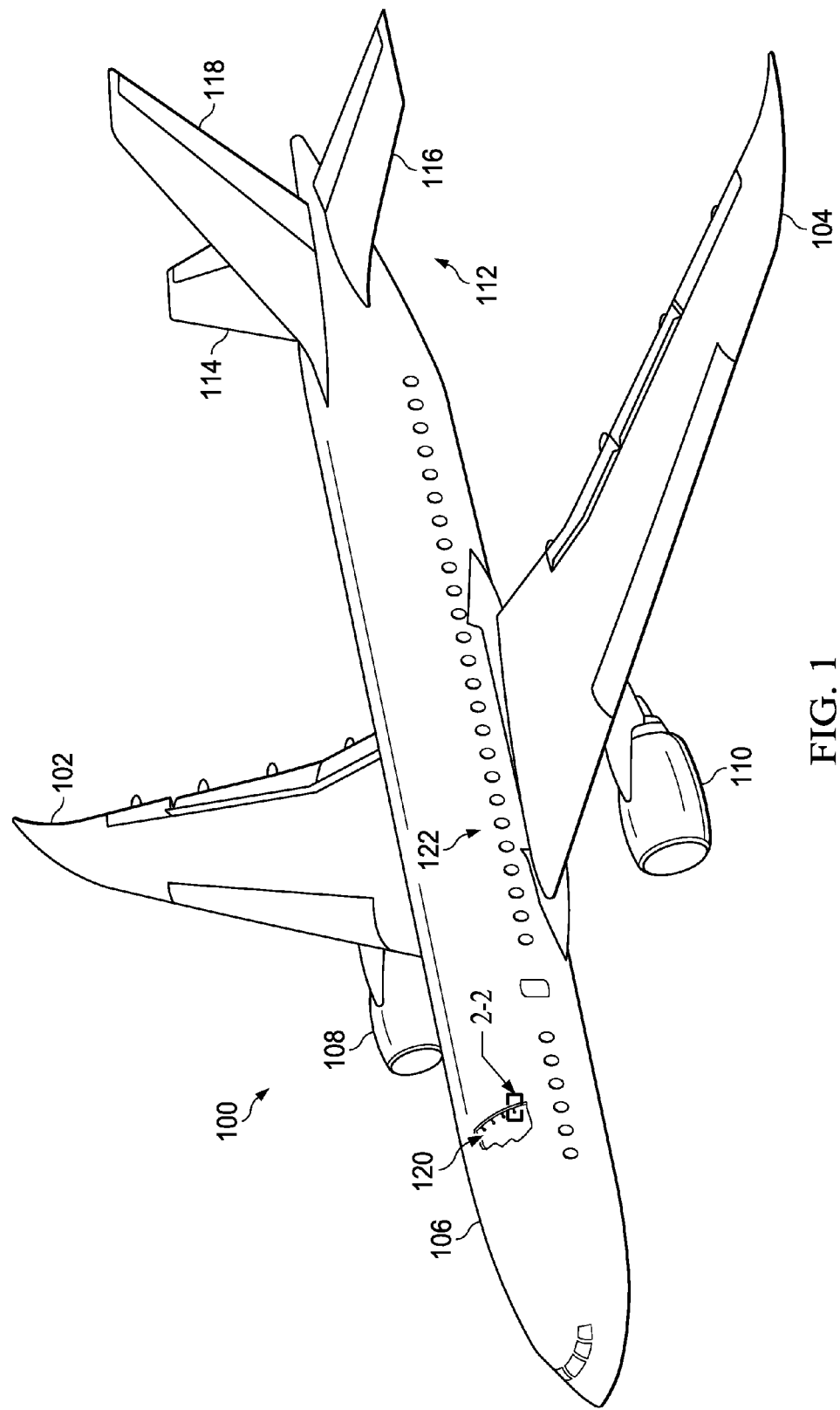
FIG. 1 is an illustration of an aircraft in which an illustrative embodiment may be implemented.

With reference now to the Figures, and in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having stringers in which reinforced bladders may be used in accordance with an illustrative embodiment. For example, reinforced bladders may be used to apply pressure to stiffeners 120 to cure stiffeners 120 to composite skin 122 of aircraft. FIG. 1 depicts an exposed view of stiffeners 120.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable type of aircraft.

Figure 2:
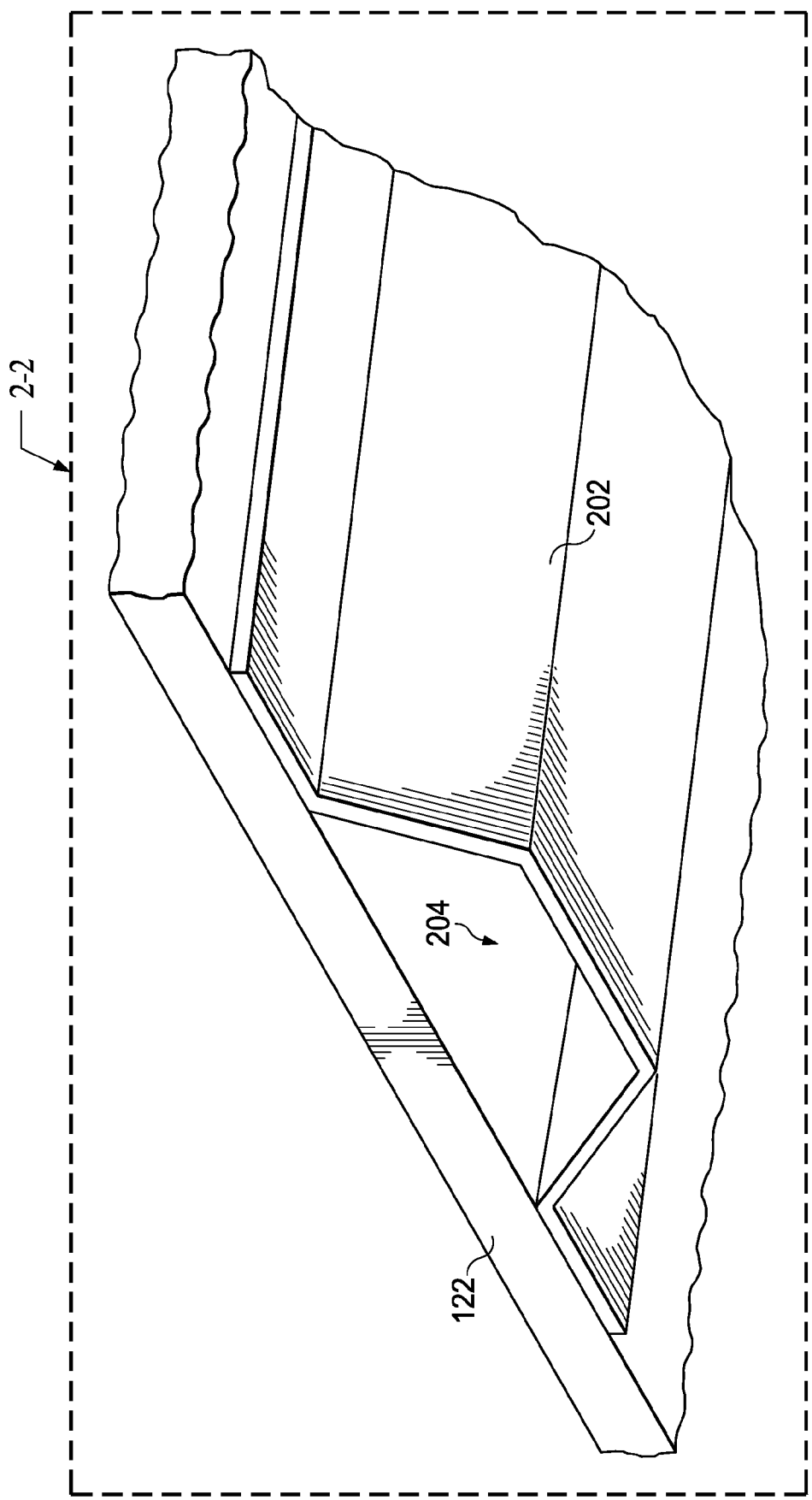
FIG. 2 is an illustration of a stringer which may be cured using a reinforced bladder in accordance with an illustrative embodiment.

Turning now to FIG. 2, an illustration of a stringer which may be cured using a reinforced bladder is depicted in accordance with an illustrative embodiment. Specifically, FIG. 2 is an enlarged view of stiffener 202 of stiffeners 120 in section 2-2 of FIG. 1.

As depicted, stiffener 202 is a hat shaped stringer. As depicted, a hat shaped stringer has a channel with a trapezoidal cross-sectional shape 204. Stiffener 202 is a composite member. Composite skin 122 is also a composite member.

Figure 3:
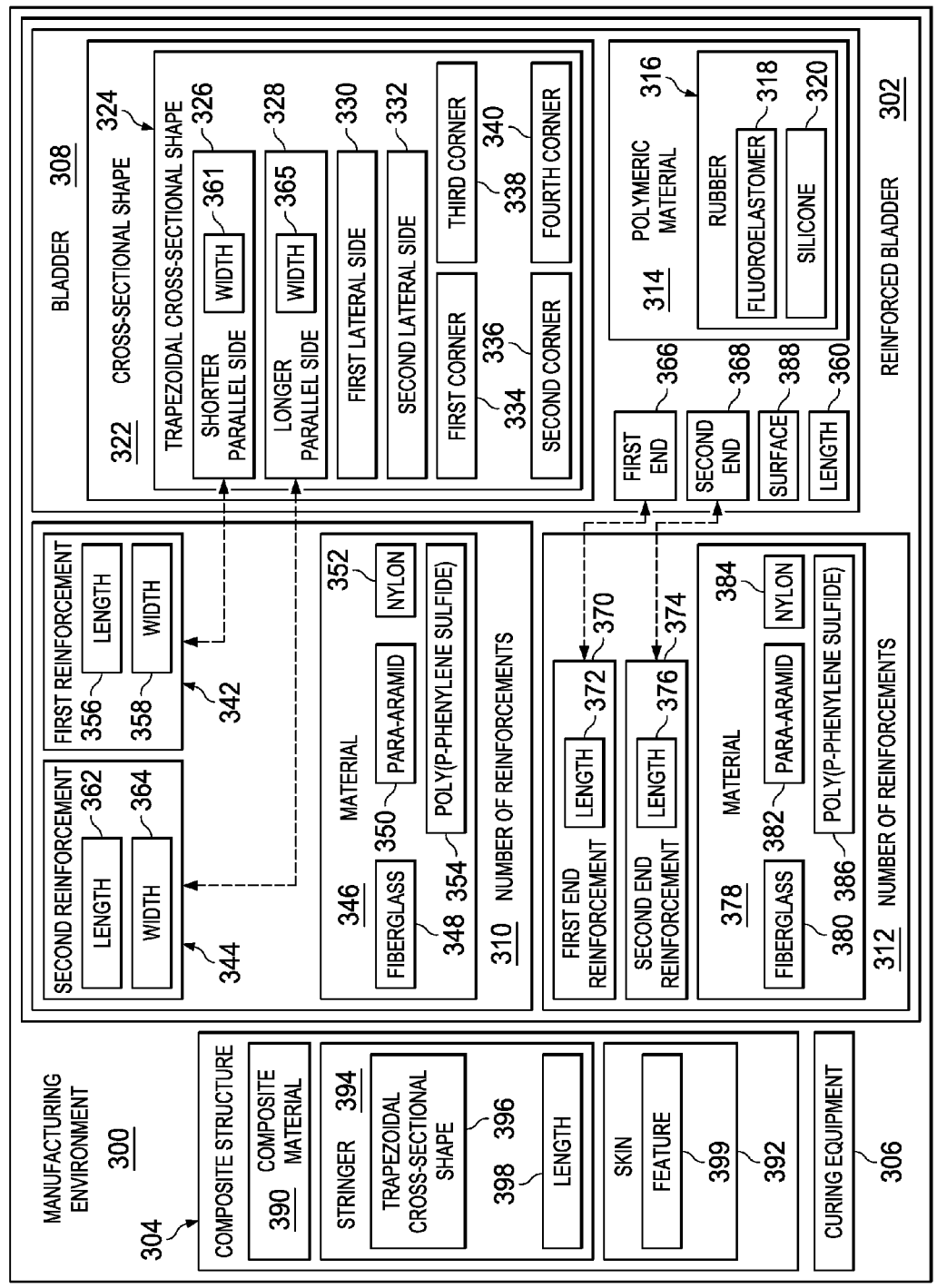
FIG. 3 is an illustration of a block diagram of a manufacturing environment in accordance with an illustrative embodiment.

Turning now to FIG. 3, an illustration of a block diagram of a manufacturing environment is depicted in accordance with an illustrative embodiment. Manufacturing environment 300 may be used to form a reinforced bladder. Manufacturing environment 300 may be used to cure a composite structure having a number of stringers, such as composite skin 122 and stiffener 202 of FIG. 2. As used herein, the phrase "a number of," means one or more items. For example, a number of stringers is one or more stringers.

Manufacturing environment 300 has reinforced bladder 302, composite structure 304, and curing equipment 306. Reinforced bladder 302 is formed of bladder 308, number of reinforcements 310, and number of reinforcements 312. Bladder 308 is formed of polymeric material 314. In some illustrative examples, polymeric material 314 may be rubber 316. In some illustrative examples, rubber 316 is selected from at least one of fluoroelastomer 318 or silicone 320.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

Polymeric material 314 may be selected based on the stiffness of polymeric material 314. In some illustrative examples, polymeric material 314 is selected such that bladder 308 will conform to curvature and features of composite structure 304. If the stiffness of polymeric material 314 is too high, bladder 308 will not conform to features of composite structure 304 such as joggles, ramp downs, ramp ups, twists, or other features.

Bladder 308 has cross-sectional shape 322. In some illustrative examples, cross-sectional shape 322 is trapezoidal cross-sectional shape 324. In these illustrative examples, trapezoidal cross-sectional shape 324 has shorter parallel side 326, longer parallel side 328, first lateral side 330, and second lateral side 332. First lateral side 330 and longer parallel side 328 are connected by first corner 334. First lateral side 330 and shorter parallel side 326 are connected by second corner 336. Shorter parallel side 326 and second lateral side 332 are connected by third corner 338. Second lateral side 332 and longer parallel side 328 are connected by fourth corner 340.

Number of reinforcements 310 may be associated with shorter parallel side 326 and longer parallel side 328. Number of reinforcements 310 includes first reinforcement 342 and second reinforcement 344. Number of reinforcements 310 provides axial reinforcement to reinforced bladder 302. Number of reinforcements 310 is formed of material 346. Material 346 is selected to withstand elevated temperatures, such as an autoclave environment. In some illustrative examples, material 346 is co-bonded to polymeric material 314. In these examples, number of reinforcements 310 may be placed on polymeric material 314 prior to curing polymeric material 314. Polymeric material 314 may then be cured with number of reinforcements 310 present. When polymeric material 314 is cured, polymeric material 314 is bonded to material 346. In some examples, material 346 is selected from at least one of fiberglass 348, para-aramid 350, nylon 352, and poly(p-phenylene sulfide) 354. Fiberglass 348 may be an open weave fiberglass. In some illustrative examples, number of reinforcements 310 is formed of an open weave fiberglass 348 co-bonded to bladder 308. When fiberglass 348 is an open weave fiberglass, polymeric material 314 may co-bond to polymeric material 314 through the holes in the open weave. An open weave is a pattern of weaving in which warp threads do not come together, leaving interstices in the material. Warp threads are lengthwise threads. Interstices are intervening spaces.

First reinforcement 342 is associated with shorter parallel side 326 of trapezoidal cross-sectional shape 324. Second reinforcement 344 is associated with longer parallel side 328 of trapezoidal cross-sectional shape 324. First reinforcement 342 has length 356 and width 358. Length 356 of first reinforcement 342 is less than length 360 of bladder 308. Length 356 is equivalent to a first fraction of length 360 of bladder 308. In other words, first reinforcement 342 extends through a first fraction of length 360 of bladder 308. In some examples, width 358 of first reinforcement 342 may be less than width 361 of shorter parallel side 326. In some examples, width 358 of first reinforcement 342 may be about the same as width 361 of shorter parallel side 326. In some examples, width 358 of first reinforcement 342 may be greater than width 361 of shorter parallel side 326. In other words, first reinforcement 342 extends across a portion of width 361 of shorter parallel side 326 of trapezoidal cross-sectional shape 324, where a portion is part or all of shorter parallel side 326.

Second reinforcement 344 has length 362 and width 364. Length 362 of second reinforcement 344 is less than length 360 of bladder 308. Length 362 is equivalent to a second fraction of length 360 of bladder 308. Length 362 of second reinforcement 344 may be the same as length 356 of first reinforcement 342. Width 364 of second reinforcement 344 may be less than width 365 of longer parallel side 328. Width 364 of second reinforcement 344 may be about the same as width 365 of longer parallel side 328. Width 364 of second reinforcement 344 may be greater than width 365 of longer parallel side 328. In these examples, second reinforcement 344 may cover first corner 334 and fourth corner 340.

In some examples in which first corner 334 and fourth corner 340 are sharp, first corner 334 and fourth corner 340 may split when bladder 308 is pressurized. A sharp corner may be an angled corner rather than a rounded corner or a rounded corner where the radius of the corner is very small relative to the thickness of the bladder. In the illustrative examples in which second reinforcement 344 covers first corner 334 and fourth corner 340, first corner 334 and fourth corner 340 may be reinforced against splitting.

Number of reinforcements 312 are associated with first end 366 and second end 368 of bladder 308. Each of number of reinforcements 312 substantially surrounds trapezoidal cross-sectional shape 324 over a fraction of length 360 of bladder 308. Number of reinforcements 312 provides circumferential reinforcement to reinforced bladder 302. First end reinforcement 370 is associated with first end 366 of bladder 308. First end reinforcement 370 has length 372. Length 372 is less than length 360 of bladder 308. Length 372 is equivalent to a third fraction of length 360 of bladder 308. Second end reinforcement 374 is associated with second end 368 of bladder 308. Second end reinforcement 374 has length 376. Length 376 is less than length 360 of bladder 308. Length 376 is equivalent to a fourth fraction of length 360 of bladder 308.

Number of reinforcements 312 is formed of material 378. Material 378 is selected to withstand elevated temperatures, such as temperatures encountered in composite processing environments such as an autoclave environment. In some examples, material 378 is selected from at least one of fiberglass 380, para-aramid 382, nylon 384, and poly(p-phenylene sulfide) 386. Fiberglass 380 may be an open weave fiberglass. In some illustrative examples, number of reinforcements 312 is formed of an open weave fiberglass 380 co-bonded to bladder 308.

By substantially surrounding trapezoidal cross-sectional shape 324 near first end 366 and second end 368, the locations of high point stresses may be reinforced. This reinforcement may prevent the initiation of a tear near first end 366 or second end 368 which could then extend through the rest of bladder 308.

As a result of length 356, length 362, length 372, and length 376, portions of surface 388 of bladder 308 remain uncovered by number of reinforcements 310 and number of reinforcements 312. In the portions of bladder 308 not covered by number of reinforcements 312, part of trapezoidal cross-sectional shape 324 remains uncovered by number of reinforcements 310. Specifically, at least one of portions of first lateral side 330 or portions of second lateral side 332 remain uncovered.

Reinforced bladder 302 may be used to apply pressure to composite structure 304 during cure. Reinforced bladder 302 may be pressurized to compress composite structure 304 during processing such as at least one of consolidation or cure. Composite structure 304 is formed of composite material 390. Composite structure 304 includes skin 392 and stringer 394. Stringer 394 may be cured on skin 392 while reinforced bladder 302 is positioned within stringer 394. Stringer 394 has trapezoidal cross-sectional shape 396 and length 398. Reinforced bladder 302 may be placed within stringer 394. Trapezoidal cross-sectional shape 396 of stringer 394 may be substantially the same as trapezoidal cross-sectional shape 324 of bladder 308. Accordingly, reinforced bladder 302 may apply pressure to substantially all of stringer 394.

Skin 392 has feature 399. Feature 399 may be at least one of a joggle, a ramp up, a ramp down, a bend, a twist, a curvature, or other feature which varies the cross-section of skin 392. As part of trapezoidal cross-sectional shape 324 remains uncovered by number of reinforcements 310, reinforced bladder 302 may substantially conform to feature 399 of skin 392. Specifically, by having number of reinforcements 310 only cover part of cross-sectional shape 322, reinforced bladder 302 may have a lower stiffness than if cross-sectional shape 322 of reinforced bladder 302 was surrounded by reinforcements along length 360.

Reinforced bladder 302 may be stiffened by number of reinforcements 310 and number of reinforcements 312 in desirable locations. Specifically, number of reinforcements 310 and number of reinforcements 312 may be positioned on bladder 308 such that reinforced bladder 302 may be removed from stringer 394 following curing without tearing. Further, number of reinforcements 310 and number of reinforcements 312 may be positioned on bladder 308 such that reinforced bladder 302 may be pressurized to a desired pressure without rupture. Further, number of reinforcements 310 and number of reinforcements 312 may be positioned on bladder 308 such that reinforced bladder 302 may be pressurized without rupture, even if reinforced bladder 302 is not positioned at the edge of stringer 394 as desired.

The illustration of manufacturing environment 300 in FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although bladder 308, as depicted, may have trapezoidal cross-sectional shape 324, in some illustrative examples, cross-sectional shape 322 of bladder 308 may be a different shape. For example, cross-sectional shape 322 of bladder 308 may be a hexagonal shape or any other desirable shape.

Figure 4:
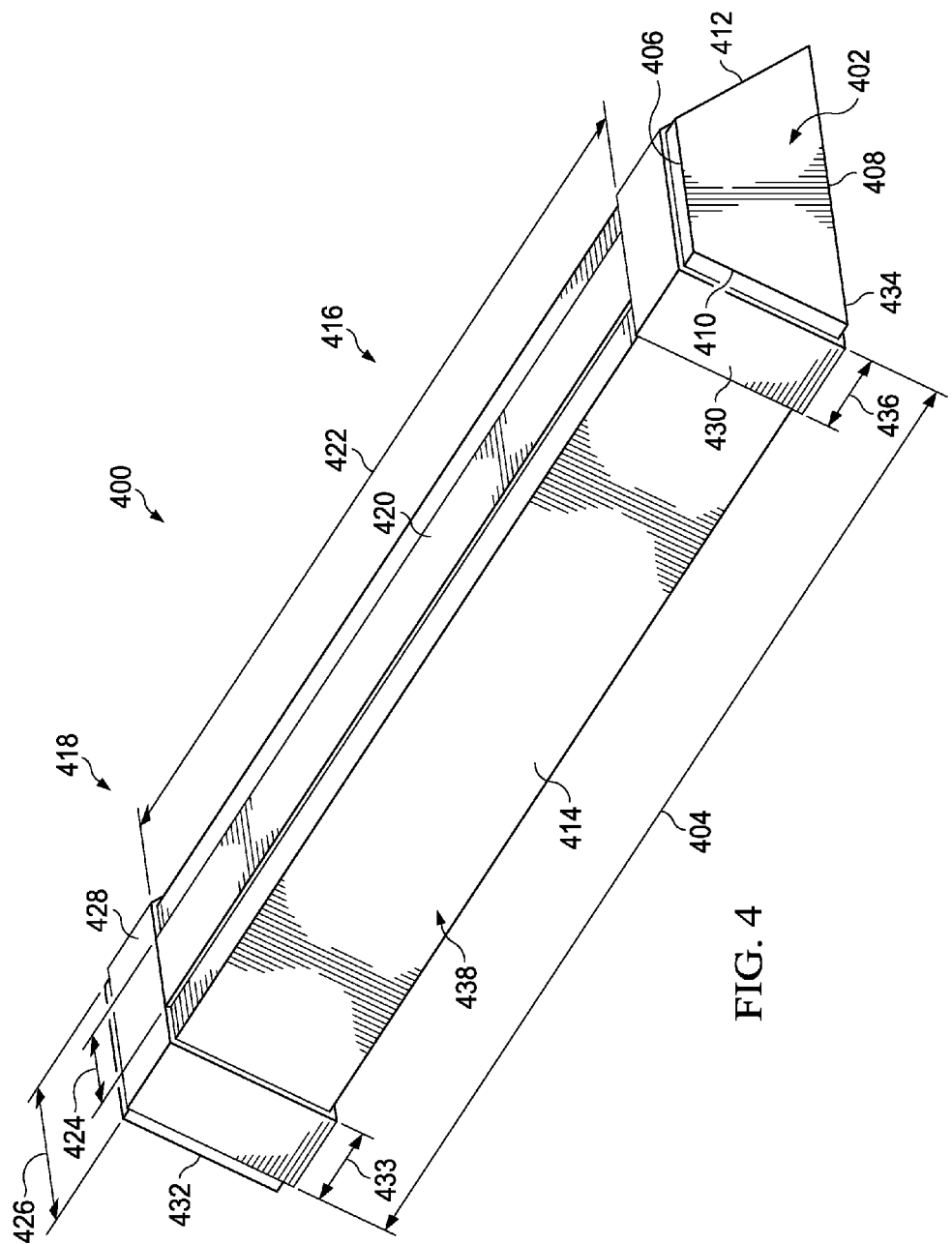
FIG. 4 is an illustration of a top isometric view of one implementation of a reinforced bladder in accordance with an illustrative embodiment.

Turning now to FIG. 4, an illustration of a top isometric view of one implementation of a reinforced bladder is depicted in accordance with an illustrative embodiment. Reinforced bladder 400 is a physical depiction of one physical implementation of reinforced bladder 302 shown in block form in FIG. 3.

Reinforced bladder 400 has trapezoidal cross-sectional shape 402 and length 404. Trapezoidal cross-sectional shape 402 has shorter parallel side 406, longer parallel side 408, first lateral side 410, and second lateral side 412. Reinforced bladder 400 includes bladder 414, number of reinforcements 416, and number of reinforcements 418.

Number of reinforcements 416 includes first reinforcement 420. First reinforcement 420 is associated with shorter parallel side 406 of trapezoidal cross-sectional shape 402. First reinforcement 420 has length 422 and width 424. Length 422 is a fraction of length 404 of reinforced bladder 400. Width 424 is a fraction of width 426 of shorter parallel side 406 of trapezoidal cross-sectional shape 402. Accordingly, first reinforcement 420 covers a portion of shorter parallel side 406 which is only a fraction of shorter parallel side 406.

As depicted, number of reinforcements 418 includes first end reinforcement 428 and second end reinforcement 430. First end reinforcement 428 is associated with first end 432 of reinforced bladder 400. First end reinforcement 428 surrounds trapezoidal cross-sectional shape 402 near first end 432. First end reinforcement has length 433 which is a fraction of length 404.

Second end reinforcement 430 is associated with second end 434 of reinforced bladder 400. Second end reinforcement 430 surrounds trapezoidal cross-sectional shape 402 near second end 434. Second end reinforcement 430 has length 436 which is a fraction of length 404.

As depicted, portion 438 of first lateral side 410 of trapezoidal cross-sectional shape 402 remains uncovered by number of reinforcements 416. As a result of portion 438 remaining uncovered, reinforced bladder 400 may have desirable properties. In some illustrative examples, as a result of portion 438 remaining uncovered, reinforced bladder 400 may substantially conform to features of a composite skin when longer parallel side 408 is positioned on the composite skin.

Figure 5:
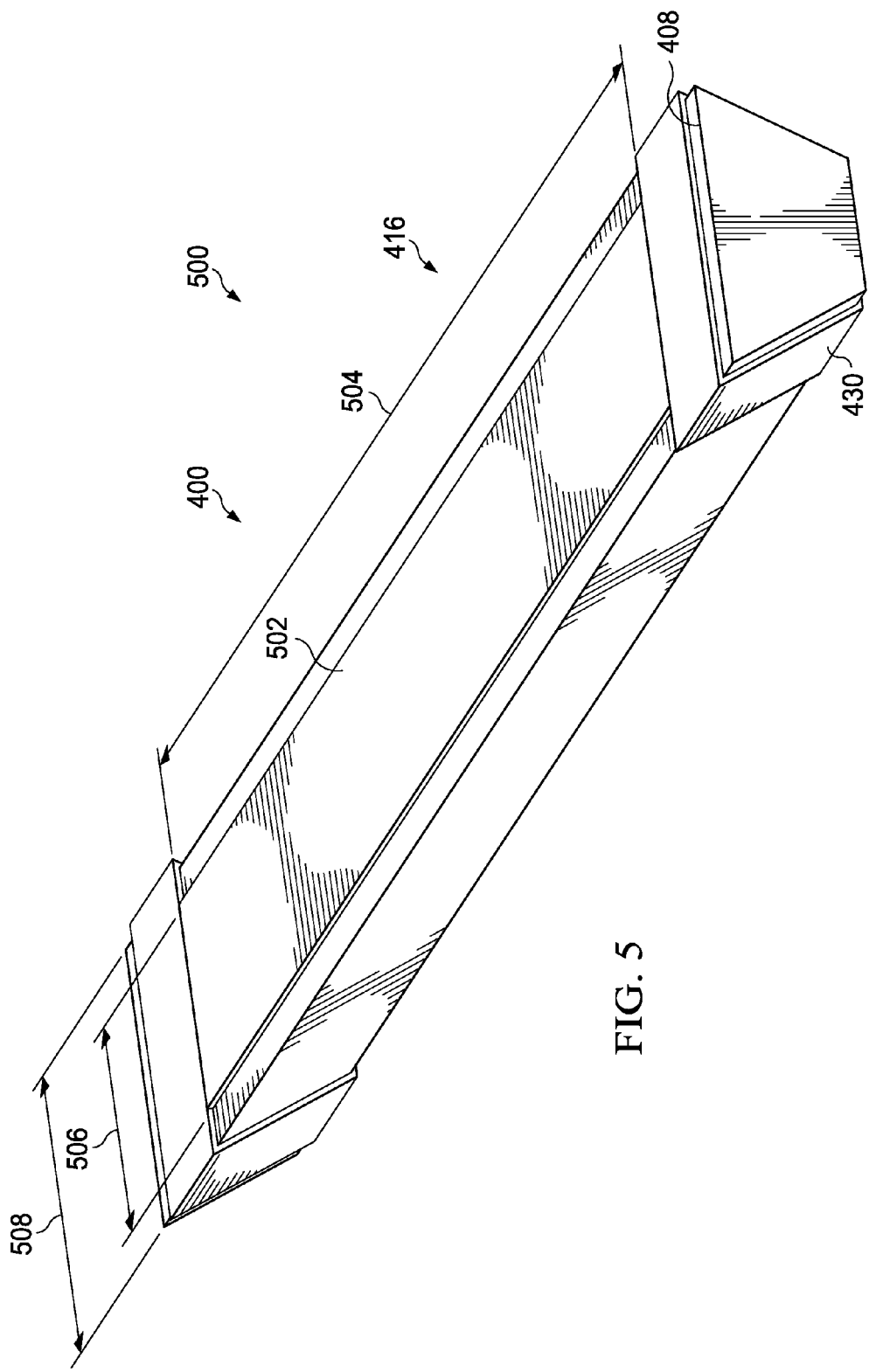
FIG. 5 is an illustration of a bottom isometric view of a reinforced bladder in accordance with an illustrative embodiment.

Turning now to FIG. 5, an illustration of a bottom isometric view of a reinforced bladder is depicted in accordance with an illustrative embodiment. View 500 is a bottom isometric view of reinforced bladder 400 of FIG. 4.

As can be seen from view 500, number of reinforcements 416 further includes second reinforcement 502. Second reinforcement 502 is associated with longer parallel side 408 of trapezoidal cross-sectional shape 402 of FIG. 4. Second reinforcement 502 has length 504 and width 506. Length 504 is a fraction of length 404 of reinforced bladder 400 shown in FIG. 4. Width 506 is a fraction of width 508 of longer parallel side 408 of trapezoidal cross-sectional shape 402. Accordingly, second reinforcement 502 covers a portion of longer parallel side 408 which is only a fraction of longer parallel side 408.

Figure 6:
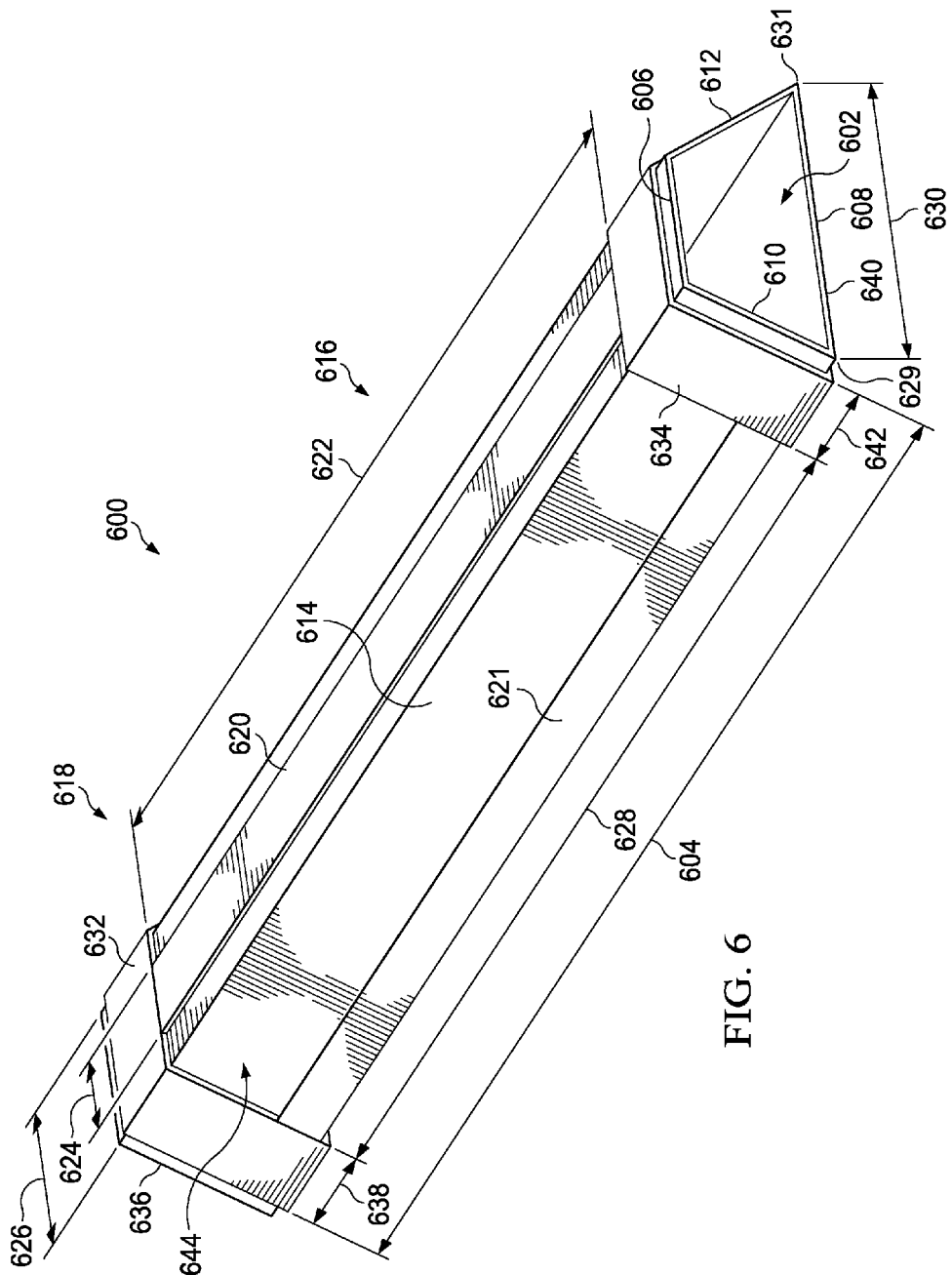
FIG. 6 is an illustration of a top isometric view of one implementation of a reinforced bladder in accordance with an illustrative embodiment.

Turning now to FIG. 6, an illustration of a top isometric view of one implementation of a reinforced bladder is depicted in accordance with an illustrative embodiment. Reinforced bladder 600 is a physical depiction of one implementation of reinforced bladder 302 shown in block form in FIG. 3.

Reinforced bladder 600 has trapezoidal cross-sectional shape 602 and length 604. Trapezoidal cross-sectional shape 602 has shorter parallel side 606, longer parallel side 608, first lateral side 610, and second lateral side 612. Reinforced bladder 600 includes bladder 614, number of reinforcements 616, and number of reinforcements 618.

Number of reinforcements 616 includes first reinforcement 620 and second reinforcement 621. First reinforcement 620 is associated with shorter parallel side 606 of trapezoidal cross-sectional shape 602. First reinforcement 620 has length 622 and width 624. Length 622 is a fraction of length 604 of reinforced bladder 600. Width 624 is a fraction of width 626 of shorter parallel side 606 of trapezoidal cross-sectional shape 602. Accordingly, first reinforcement 620 covers a portion of shorter parallel side 606 which is only a fraction of shorter parallel side 606.

Second reinforcement 621 is associated with longer parallel side 608 of trapezoidal cross-sectional shape 602. Second reinforcement 621 has length 628. Length 628 is a fraction of length 604 of reinforced bladder 600. In this illustrative example, second reinforcement 621 has a width greater than width 630 of longer parallel side 608 of trapezoidal cross-sectional shape 602. Accordingly, second reinforcement 621 covers a portion of longer parallel side 608 and continues onto first lateral side 610 and second lateral side 612 of trapezoidal cross-sectional shape 602. By continuing onto first lateral side 610 and second lateral side 612 of trapezoidal cross-sectional shape 602, second reinforcement 621 covers longer parallel side 608 and a portion of each of first lateral side 610 and second lateral side 612 of trapezoidal cross-sectional shape 602 across a fraction of length 604 of bladder 614. By second reinforcement 621 continuing onto first lateral side 610 and second lateral side 612 of trapezoidal cross-sectional shape 602, second reinforcement 621 may reinforce corner 629 and corner 631 against splitting.

Number of reinforcements 618 includes first end reinforcement 632 and second end reinforcement 634. First end reinforcement 632 is associated with first end 636 of reinforced bladder 600. First end reinforcement 632 surrounds trapezoidal cross-sectional shape 602 near first end 636. First end reinforcement 632 has length 638 which is a fraction of length 604.

Second end reinforcement 634 is associated with second end 640 of reinforced bladder 600. Second end reinforcement 634 surrounds trapezoidal cross-sectional shape 602 near second end 640. Second end reinforcement 634 has length 642 which is a fraction of length 604.

As depicted, portion 644 of first lateral side 610 of trapezoidal cross-sectional shape 602 remains partially uncovered by number of reinforcements 616. As a result of portion 644 remaining uncovered, reinforced bladder 600 may have desirable properties. In some illustrative examples, as a result of portion 644 remaining uncovered, reinforced bladder 600 may substantially conform to features of a composite skin when longer parallel side 608 is positioned on the composite skin.

The different components shown in FIGS. 1-2 and 4-6 may be combined with components in FIG. 3 used with components in FIG. 3, or a combination of the two. Additionally, some of the components in FIGS. 1-2 and 4-6 may be illustrative examples of how components shown in block form in FIG. 3 can be implemented as physical structures.

Figure 7:
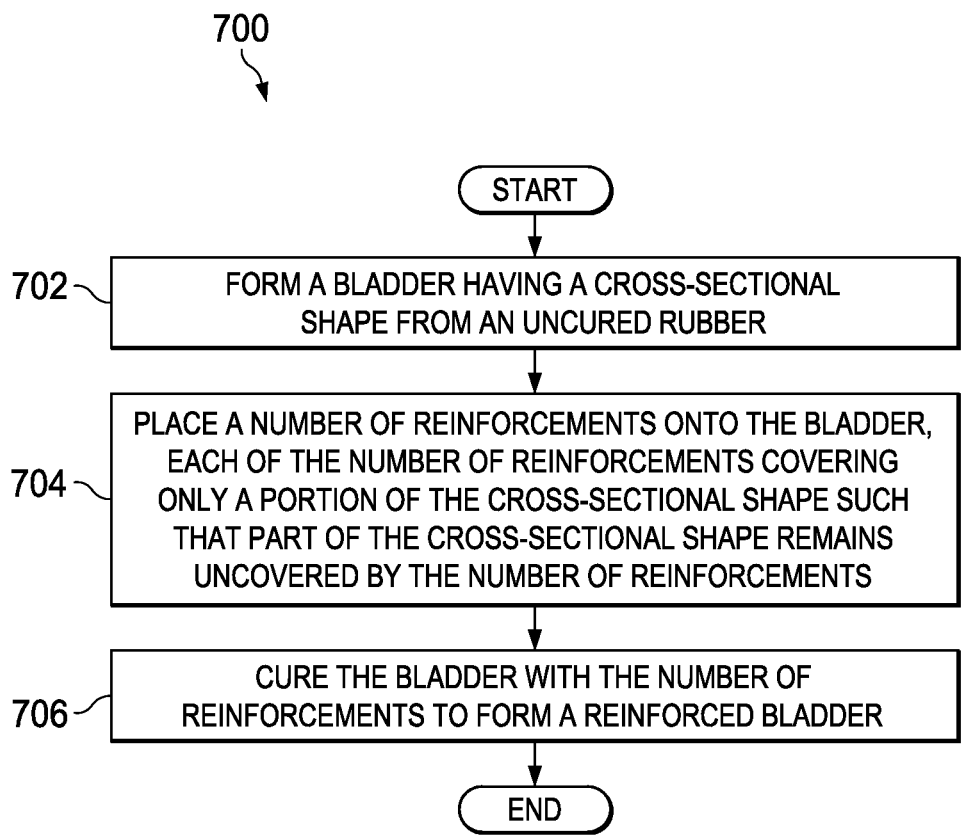
FIG. 7 is an illustration of a flowchart of a process for forming a reinforced bladder in accordance with an illustrative embodiment.

Turning now to FIG. 7, an illustration of a flowchart of a process for forming a reinforced bladder is depicted in accordance with an illustrative embodiment. Process 700 may be used in manufacturing environment 300 in FIG. 3 to form a reinforced bladder such as reinforced bladder 302 of FIG. 3, reinforced bladder 400 of FIG. 4, or reinforced bladder 600 of FIG. 6.

The process begins by forming a bladder having a cross-sectional shape from an uncured rubber (operation 702). This bladder may be bladder 308 of FIG. 3. In some illustrative examples, the cross-sectional shape is a trapezoidal cross-sectional shape. In other illustrative examples, the cross-sectional shape may be any desirable shape.

In some illustrative examples, the uncured rubber is selected from at least one of a fluoroelastomer or a silicone. The uncured rubber may be selected for a desirable stiffness after cure.

The process then places a number of reinforcements onto the bladder, each of the number of reinforcements covering only a portion of the cross-sectional shape such that part of the cross-sectional shape remains uncovered by the number of reinforcements (operation 704.) The number of reinforcements may be number of reinforcements 310 of FIG. 3. By leaving part of the cross-sectional shape uncovered, the resulting reinforced bladder may be able to substantially conform to features such as at least one of a joggle, a ramp up, a ramp down, a bend, a twist, or a curvature.

In the illustrative examples in which the cross-sectional shape is a trapezoidal cross-sectional shape, placing the number of reinforcements on the bladder comprises placing a first reinforcement onto a portion of the shorter parallel side of the trapezoidal cross-sectional shape. This first reinforcement provides axial reinforcement to the reinforced bladder.

In some illustrative examples, placing the number of reinforcements on the bladder further comprises placing a second reinforcement onto a portion of the longer parallel side of the trapezoidal cross-sectional shape. This second reinforcement provides axial reinforcement to the reinforced bladder.

In some illustrative examples, the second reinforcement extends a fraction of the length of the bladder. Further, in these illustrative examples, placing the second reinforcement comprises placing the second reinforcement such that the second reinforcement covers the longer parallel side of the trapezoidal cross-sectional shape and a portion of each of the lateral sides of the trapezoidal cross-sectional shape across the fraction of the length of the bladder. By covering a portion of each of the lateral sides of the trapezoidal cross-sectional shape, the second reinforcement may reinforce two corners of the reinforced bladder against splitting. By leaving a portion of each of the lateral sides of the trapezoidal cross-sectional shape uncovered by the first reinforcement and the second reinforcement, the resulting reinforced bladder may substantially conform to the features of a composite structure.

The process then cures the bladder with the number of reinforcements to form a reinforced bladder (operation 706). Afterwards, the process terminates.

By curing the bladder with the number of reinforcements present, the number of reinforcements is bonded to the rubber. In some illustrative examples, the rubber may flow through holes of an open weave of the reinforcements to bond the number of reinforcements to the rubber.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, the process may further place a second number of reinforcements onto the bladder such that each of the second number of reinforcements extends a respective fraction of a length of the bladder and surrounds the cross-sectional shape. The second number of reinforcements may be associated with respective ends of the bladder. The second number of reinforcements may provide circumferential reinforcement for the bladder.

In some examples, the process may place the reinforced bladder within a tool, and pressurize the reinforced bladder to compress a composite material. The tool may take the form of an autoclave, an oven, a vacuum bag, or any other desirable tool for processing the composite material. The processing of the composite material may include at least one of consolidation and curing the composite material. In these examples, the reinforced bladder may form an inner mold line for the composite material.

In some examples, the reinforced bladder is surrounded by the composite material and the reinforced bladder substantially conforms to features of the composite material. These features may include at least one of a ramp up, a ramp down, a twist, a curvature, a joggle, or a bend.

Figure 8:
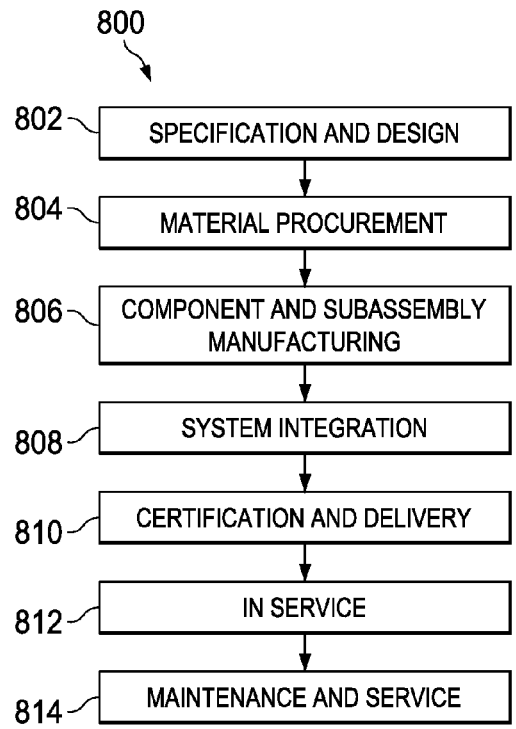
FIG. 8 is an illustration of an aircraft manufacturing and service method in the form of a block diagram in accordance with an illustrative embodiment.
Figure 9:
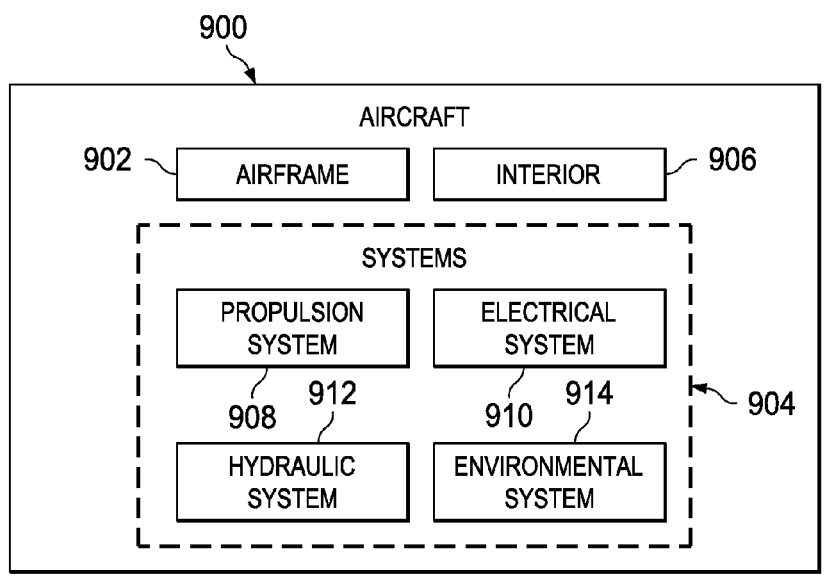
FIG. 9 is an illustration of an aircraft in the form of a block diagram in which an illustrative embodiment may be implemented.

The illustrative embodiments of the present disclosure may be described in the context of aircraft manufacturing and service method 800 as shown in FIG. 8 and aircraft 900 as shown in FIG. 9. Turning first to FIG. 8, an illustration of an aircraft manufacturing and service method is depicted in the form of a block diagram in accordance with an illustrative embodiment. During pre-production, aircraft manufacturing and service method 800 may include specification and design 802 of aircraft 900 of FIG. 9 and material procurement 804.

During production, component and subassembly manufacturing 806 and system integration 808 of aircraft 900 of FIG. 9 takes place. Thereafter, aircraft 900 of FIG. 9 may go through certification and delivery 810 in order to be placed in service 812. While in service 812 by a customer, aircraft 900 of FIG. 9 is scheduled for routine maintenance and service 814, which may include modification, reconfiguration, refurbishment, and other maintenance or service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of an aircraft is depicted in the form of a block diagram in which an illustrative embodiment may be implemented. In this example, aircraft 900 is produced by aircraft manufacturing and service method 800 of FIG. 8 and may include airframe 902 with systems 904 and interior 906. Examples of systems 904 include one or more of propulsion system 908, electrical system 910, hydraulic system 912, and environmental system 914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 800 of FIG. 8. One or more illustrative embodiments may be used during component and subassembly manufacturing 806. For example, reinforced bladders may be used during curing of composite stringer 200 of FIG. 2 during component and subassembly manufacturing 806.

Thus the illustrative embodiments provide a reinforced bladder having a desirable stiffness. The desirable stiffness may be achieved by reinforcing portions of a bladder formed of a polymeric material such that part of the cross-sectional shape of the bladder remains uncovered by the number of reinforcements. The reinforced bladder may be used to provide pressure within a composite stringer during curing. The reinforced bladder may provide an inner mold line for the composite stringer.

The reinforced bladder may substantially conform to features of a composite structure such as at least one of a joggle, a ramp up, a ramp down, a bend, a twist, or a curvature. Use of the reinforced bladder may reduce manufacturing inconsistencies such as resin richness. By reducing manufacturing inconsistencies, the reinforced bladder may reduce at least one of manufacturing costs and manufacturing time. Using reinforced bladders may reduce the number of reworks, thus reducing the cost and time spent manufacturing a composite structure.

As a result of the number of reinforcements, the initiation of a tear may be prevented in the bladder. Specifically, a number of reinforcements associated with a first end and a second end of the reinforced bladder may prevent the initiation of a tear at the ends of the reinforced bladder. Further, a number of reinforcements covering only a fraction of the cross-sectional shape of the reinforced bladder may prevent the initiation of a tear in the reinforced bladder. The number of reinforcements covering only a fraction of the cross-sectional shape of the reinforced bladder may increase the axial strength of the reinforced bladder. The number of reinforcements near the ends and the number of reinforcements covering a fraction of the cross-sectional shape may aid in the removal of the reinforced bladder from a composite stringer. By preventing the initiation of a tear in the reinforced bladder, at least one of manufacturing time or cost may be reduced. Further, difficult and time-consuming recovery of pieces of torn polymeric bladders may reduce in frequency.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for forming a reinforced bladder, the method comprising:
    forming a bladder comprising a cross-sectional shape from an uncured rubber;
    placing a number of reinforcements around an exterior of the bladder, each of the number of reinforcements covering only a portion of the cross-sectional shape, such that part of the cross-sectional shape remains uncovered by the number of reinforcements;
    curing the bladder while co-curing the number of reinforcements to the exterior of the bladder, thus forming the reinforced bladder;
    placing the reinforced bladder within a tool; and
    pressurizing the reinforced bladder to compress a composite material.

2. The method of claim 1, wherein the cross-sectional shape is a trapezoidal cross-sectional shape, and wherein placing the number of reinforcements on the bladder comprises placing a first reinforcement onto a portion of a shorter parallel side of the trapezoidal cross-sectional shape.

3. The method of claim 2, wherein placing the number of reinforcements on the bladder further comprises placing a second reinforcement onto a portion of a longer parallel side of the trapezoidal cross-sectional shape.

4. The method of claim 3, wherein the second reinforcement extends a fraction of a length of the bladder, and wherein placing the second reinforcement comprises placing the second reinforcement such that the second reinforcement covers the longer parallel side of the trapezoidal cross-sectional shape and a portion of each of lateral sides of the trapezoidal cross-sectional shape across the fraction of the length of the bladder.

5. The method of claim 1 further comprising:
    placing a second number of reinforcements onto the bladder such that each of the second number of reinforcements extends a respective fraction of a length of the bladder and surrounds the cross-sectional shape.

6. The method of claim 1, wherein the cross-sectional shape is a trapezoidal cross-sectional shape, and wherein placing the number of reinforcements on the bladder comprises placing a first reinforcement onto a portion of a shorter parallel side of the trapezoidal cross-sectional shape and placing a second reinforcement onto a portion of a longer parallel side of the trapezoidal cross-sectional shape, the method further comprising:

placing a second number of reinforcements onto the bladder such that each of the second number of reinforcements extends a respective fraction of a length of the bladder and surrounds the trapezoidal cross-sectional shape.

7. The method of claim 6, wherein the second reinforcement extends a fraction of the length of the bladder, and wherein placing the second reinforcement comprises placing the second reinforcement such that the second reinforcement covers the longer parallel side of the trapezoidal cross-sectional shape and a portion of each of lateral sides of the trapezoidal cross-sectional shape across the fraction of the length of the bladder.

8. A method for forming a reinforced bladder, the method comprising:

forming a bladder comprising a cross-sectional shape from an uncured rubber;

placing a number of reinforcements around an exterior of the bladder, each of the number of reinforcements covering only a portion of the cross-sectional shape, such that part of the cross-sectional shape remains uncovered by the number of reinforcements;

curing the bladder while co-curing the number of reinforcements to the exterior of the bladder, thus forming the reinforced bladder;

placing the reinforced bladder within a tool such that a composite material surrounds the reinforced bladder, such that the reinforced bladder substantially conforms to features of the composite material; and pressurizing the reinforced bladder to compress the composite material.

9. The method of claim 8, wherein the cross-sectional shape is a trapezoidal cross-sectional shape, and wherein placing the number of reinforcements on the bladder comprises placing a first reinforcement onto a portion of a shorter parallel side of the trapezoidal cross-sectional shape.

10. The method of claim 9, wherein placing the number of reinforcements on the bladder further comprises placing a second reinforcement onto a portion of a longer parallel side of the trapezoidal cross-sectional shape.

11. The method of claim 10, wherein the second reinforcement extends a fraction of a length of the bladder, and wherein placing the second reinforcement comprises placing the second reinforcement such that the second reinforcement covers the longer parallel side of the trapezoidal cross-sectional shape and a portion of each of lateral sides of the trapezoidal cross-sectional shape across the fraction of the length of the bladder.

12. The method of claim 8 further comprising:

placing a second number of reinforcements onto the bladder such that each of the second number of reinforcements extends a respective fraction of a length of the bladder and surrounds the cross-sectional shape.

13. The method of claim 8, wherein the cross-sectional shape is a trapezoidal cross-sectional shape, and wherein placing the number of reinforcements on the bladder comprises placing a first reinforcement onto a portion of a shorter parallel side of the trapezoidal cross-sectional shape and placing a second reinforcement onto a portion of a longer parallel side of the trapezoidal cross-sectional shape, the method further comprising:

placing a second number of reinforcements onto the bladder such that each of the second number of reinforcements extends a respective fraction of a length of the bladder and surrounds the trapezoidal cross-sectional shape.

14. The method of claim 13, wherein the second reinforcement extends a fraction of the length of the bladder, and wherein placing the second reinforcement comprises placing the second reinforcement such that the second reinforcement covers the longer parallel side of the trapezoidal cross-sectional shape and a portion of each of lateral sides of the trapezoidal cross-sectional shape across the fraction of the length of the bladder.

15. A method for forming a composite material using a reinforced bladder, the method comprising:

forming a bladder comprising a cross-sectional shape from an uncured rubber;

placing a number of reinforcements around an exterior of the bladder, each of the number of reinforcements covering only a portion of the cross-sectional shape, such that part of the cross-sectional shape remains uncovered by the number of reinforcements;

curing the bladder while co-curing the number of reinforcements to the exterior of the bladder, thus forming the reinforced bladder;

placing the reinforced bladder within a tool such that the composite material surrounds the reinforced bladder, such that the reinforced bladder substantially conforms to features of the composite material, such that the features comprise at least one feature from of a group of features comprising: a joggle, a ramp up, a ramp down, a bend, a twist, and a curvature; and pressurizing the reinforced bladder to compress the composite material.

16. The method of claim 15, wherein the cross-sectional shape is a trapezoidal cross-sectional shape, and wherein placing the number of reinforcements on the bladder comprises placing a first reinforcement onto a portion of a shorter parallel side of the trapezoidal cross-sectional shape.

17. The method of claim 16, wherein placing the number of reinforcements on the bladder further comprises placing a second reinforcement onto a portion of a longer parallel side of the trapezoidal cross-sectional shape.

18. The method of claim 17, wherein the second reinforcement extends a fraction of a length of the bladder, and wherein placing the second reinforcement comprises placing the second reinforcement such that the second reinforcement covers the longer parallel side of the trapezoidal cross-sectional shape and a portion of each of lateral sides of the trapezoidal cross-sectional shape across the fraction of the length of the bladder.

19. The method of claim 15 further comprising:

placing a second number of reinforcements onto the bladder such that each of the second number of reinforcements extends a respective fraction of a length of the bladder and surrounds the cross-sectional shape.

20. The method of claim 15, wherein the cross-sectional shape is a trapezoidal cross-sectional shape, and wherein placing the number of reinforcements on the bladder comprises placing a first reinforcement onto a portion of a shorter parallel side of the trapezoidal cross-sectional shape and placing a second reinforcement onto a portion of a longer parallel side of the trapezoidal cross-sectional shape, the method further comprising:

placing a second number of reinforcements onto the bladder such that each of the second number of reinforcements extends a respective fraction of a length of the bladder and surrounds the trapezoidal cross-sectional shape.

* * * * *